W. S. PRITCHARD.
SAW FILING MACHINE.
APPLICATION FILED AUG. 19, 1920.
1,417,687.
Patented May 30, 1922.
4 SHEETS—SHEET 1.
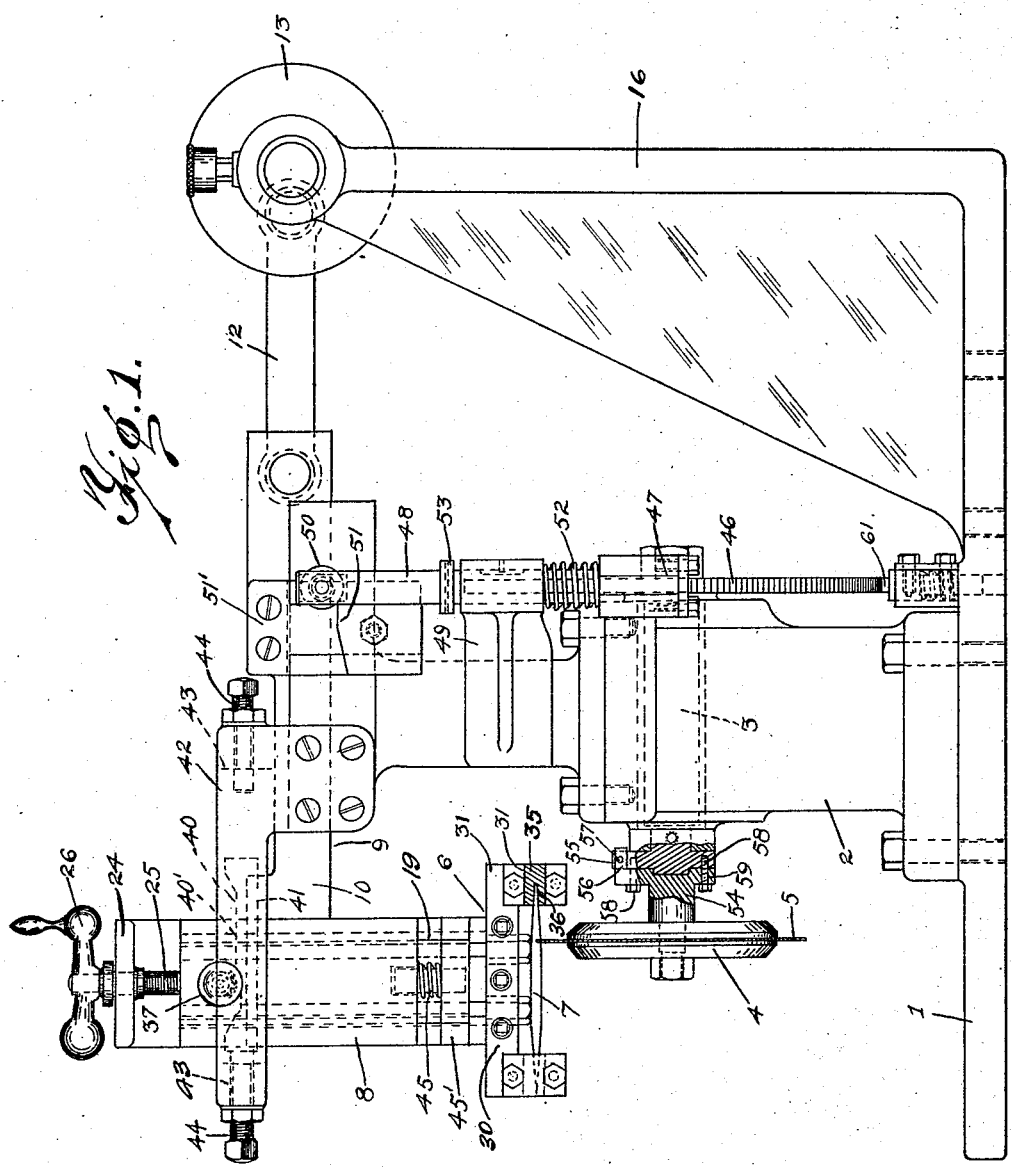
Inventor
William S. Pritchard
By Whittemore Hulbert & Whittemore
Attorneys

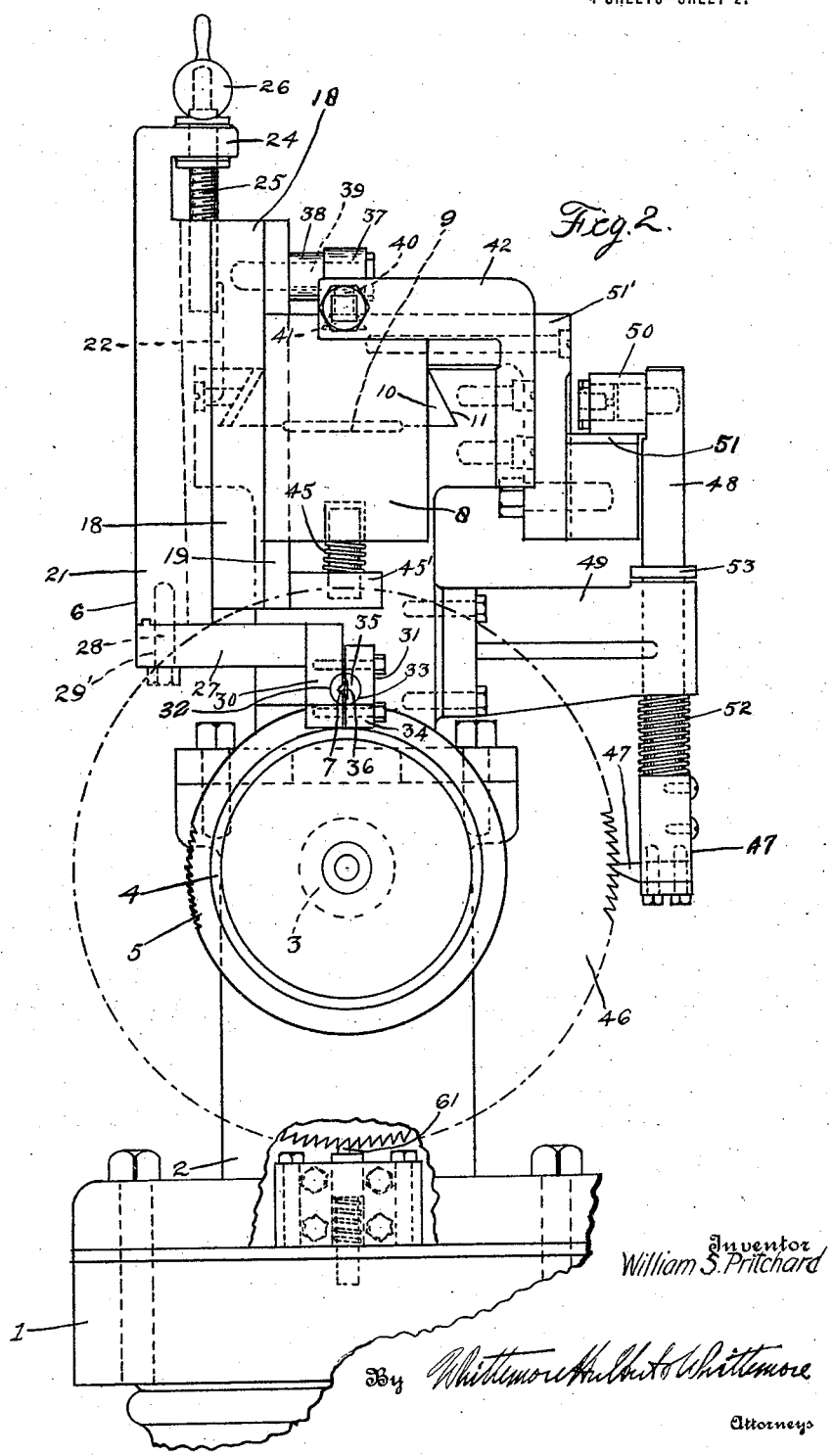

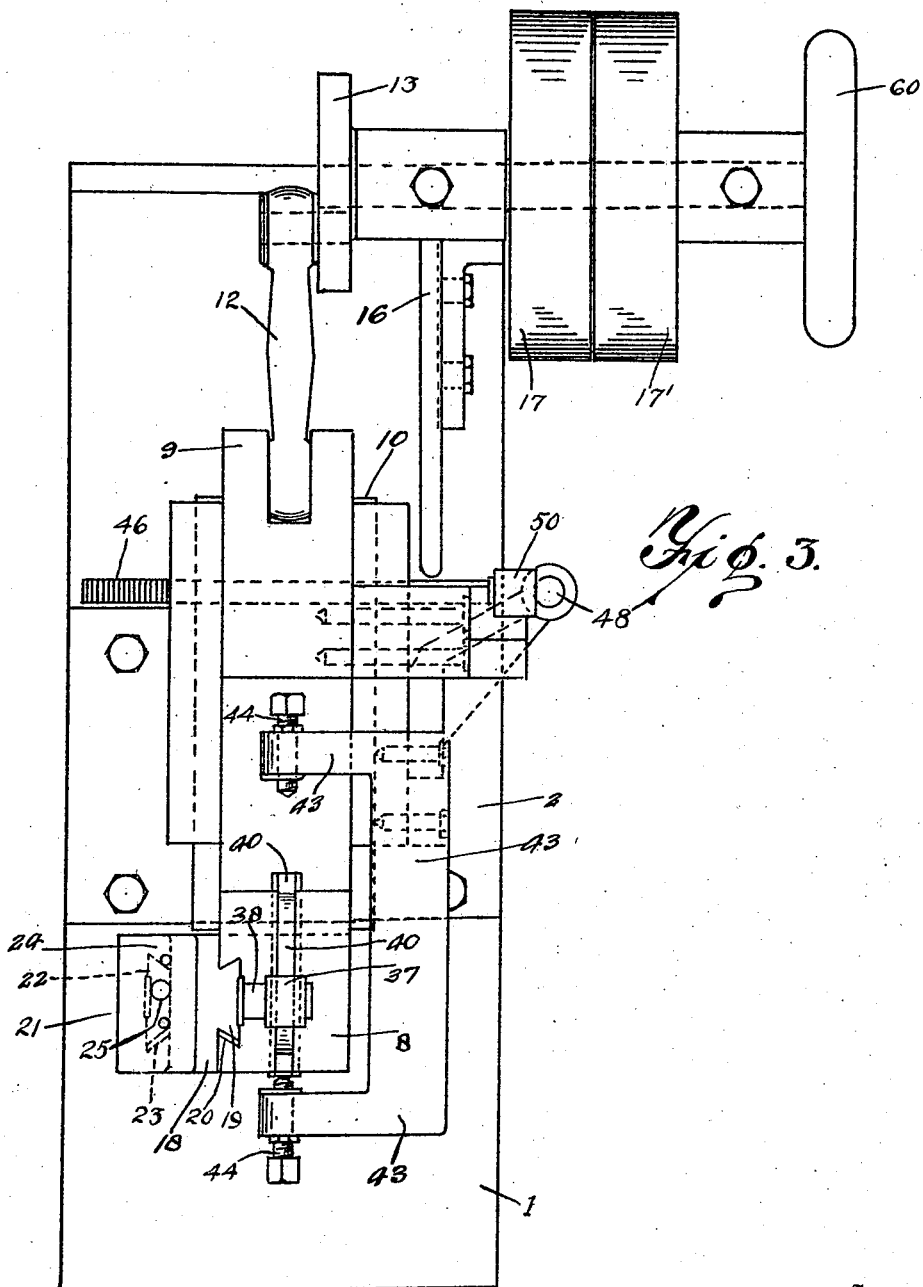

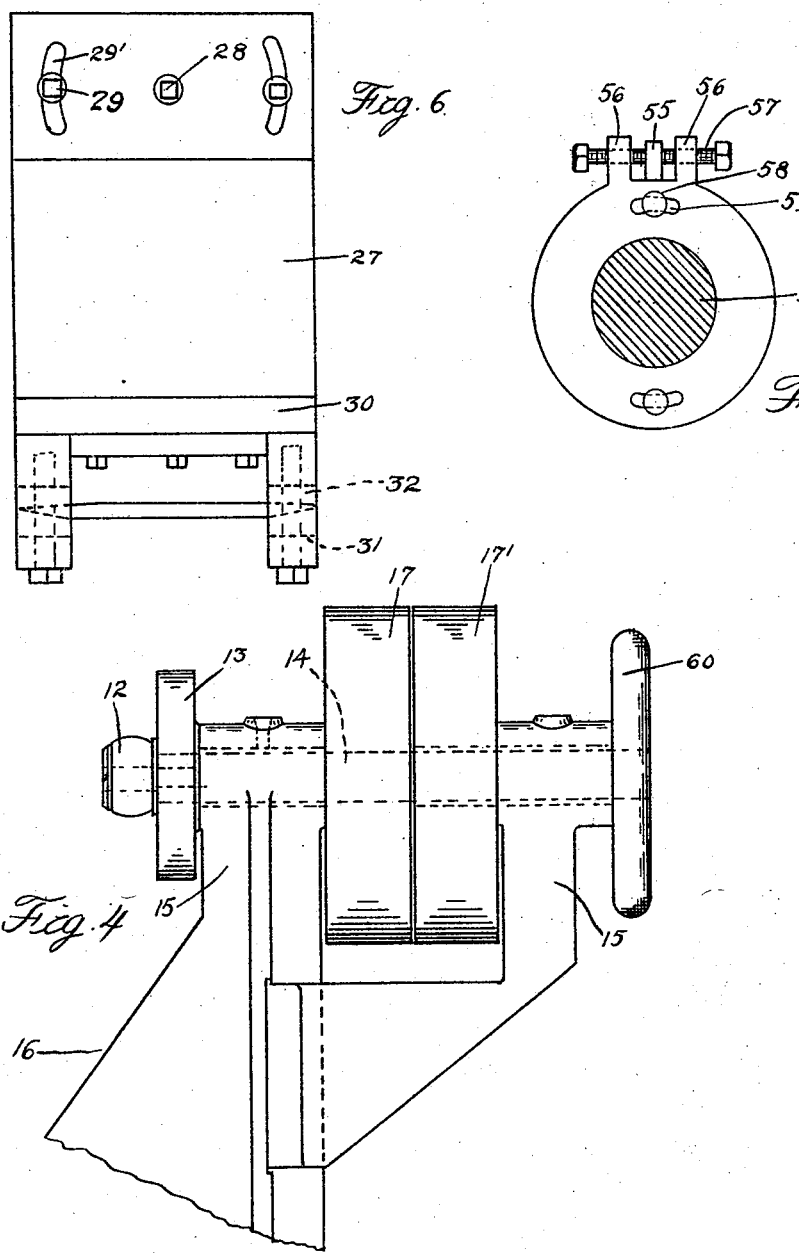

UNITED STATES PATENT OFFICE.

WILLIAM S. PRITCHARD, OF DETROIT, MICHIGAN.

SAW-FILING MACHINE.

1,417,687. Specification of Letters Patent. Patented May 30, 1922.

Application filed August 19, 1920. Serial No. 404,573.

*To all whom it may concern:*

Be it known that I, WILLIAM S. PRITCHARD, a citizen of the United States of America, residing at Detroit, in the county of Wayne and State of Michigan, have invented certain new and useful Improvements in Saw-Filing Machines, of which the following is a specification, reference being had therein to the accompanying drawings.

The invention relates to machines for filing saws, and has for its main object the provision of a construction for positively indexing the saw when the file is out of engagement therewith. Another object is to provide means for universally adjusting the file; and further, to provide means for adjusting the saw relative to the file while the saw is clamped. The invention has for other objects the novel arrangements and combinations of parts as more fully hereinafter set forth.

In the drawings:

Figure 1 is a side elevation, partly in section, of a machine embodying my invention;

Figure 2 is a front elevation thereof;

Figure 3 is a top plan view thereof;

Figure 4 is a rear elevation of a portion thereof;

Figure 5 is a cross section on the line 5—5 of Figure 1;

Figure 6 is a bottom plan view of the mechanism for clamping the file.

1 is the base of the machine and 2 the standard mounted thereon. 3 is an arbor journaled in the standard and 4 is a clamp for the circular saw 5 mounted upon the arbor. 6 is a head adapted to carry the file 7 and to reciprocate transversely of the saw. 8 is a support for the head, and 9 an arm extending laterally from the support and having the tongue 10 slidably engaging in the groove 11 in the upper end of the standard 2. This groove has undercut sides to prevent disengagement of the tongue.

For reciprocating the arm 9, there is the connecting rod 12 pivotally connected to the rear end of the arm and also to the crank wheel 13, which latter is fixedly secured to the shaft 14, journaled in the furcations 15 of a second standard 16 upon the base 1. An idler pulley wheel 17 and a driving pulley wheel 17¹ are mounted upon the shaft between the furcations, the driving pulley wheel being fixedly secured to the shaft.

The head 6 comprises the vertically movable slide 18 having the tongue 19 slidably engaging in the groove 20 having undercut sides and located in the support 8, and also the vertically adjustable slide 21 having the groove 23 with undercut sides slidably engaged in by the tongue 22 upon the vertically movable slide 18. This vertically adjustable slide 21 is provided with the over-hanging flange 24 through which vertically extends the adjusting screw 25 which threadedly engages in the vertically movable slide 18 and is connected to the hand wheel 26 for raising and lowering the vertically adjustable slide 21 relative to the vertically movable slide 18 and also relative to the saw 5.

Mounted upon the lower end of the vertically adjustable slide 21 is the horizontal plate 27 which is rotatably adjustable in a horizontal plane. In detail, this plate has the cap bolt 28 passing therethrough and threadedly engaging the slide and also the cap bolts 29 passing through the elongated slots 29¹ and threadedly engaging the slide. 30 is a bifurcated block secured to the inner end of the plate 27 and rotatably adjustable relative thereto in a vertical plane, the arrangement being the same as that for securing the plate to the vertically adjustable slide. The furcations 31 of this block have the semi-cylindrical bearings 32 which are adapted to cooperate with the semi-cylindrical bearings 33 in the caps 34 to hold the cylindrical members 35 in place. These cylindrical members have the axial recesses 36 therein of suitable shape to fit the ends of the file 7. The arrangement is such that the file may be adjusted in all directions, by rotating the same about its longitudinal axis, which is accomplished by rotating the cylindrical member 35; by rotating the same vertically in its plane to raise and lower its ends, which is accomplished by rotating the bifurcated block 30; and by rotating the same horizontally in its plane to move its ends inwardly and outwardly relative to the saw teeth, this latter being accomplished by rotating the horizontal plate 27.

In order to raise the file 7 during the non-cutting portion of its stroke so as to be out of engagement with the teeth of the saw 5 and permit the latter to be indexed, the vertically movable slide 18 has the roller 37 at its inner side and spaced therefrom by means of the collar 38 surrounding the bolt 39 extending into the vertically movable slide and upon which the roller is mounted. 40 is a cam slidably engaging in the groove 41 having under cut sides and located in the upper edge of the support 8. 42 is a lateral yoke fixedly secured to the upper end of the standard 2 and having the furcations 43 in which threadedly engage the aligned set screws 44, the inner ends of which are adapted to engage the opposite ends of the cam 40 upon movement thereof with the reciprocating support to hold the cam stationary during end portion of the travel of the support in opposite directions. The cam has the raised surface 40¹ which is adapted to be engaged by the roller 37 to raise the head 6 and with it the file 7, the arrangement being such that upon movement of the support and head in a rearward direction the cam moves therewith until engaged by the rear stop and upon continued rearward movement of the support and head the roller engages the raised surface of the cam and raises the head. Upon forward movement of the support and head, the cam moves forward therewith holding the head in raised position, until engaged by the front stop, when the roller moves off the raised surface, and permits the head to lower upon continued forward movement of the support and head. The coil spring 45 between the lower end of the support 8 and the lateral projection 45¹ upon the vertically movable slide 18 yieldably maintains the roller in engagement with the cam at all times.

For the purpose of indexing the saw 5 the following construction is provided: 46 is a gear wheel fixedly mounted upon the rear end of the arbor 3, and 47 is a dog adapted to engage the teeth of the gear wheel. This dog is mounted upon the vertically movable rod 48, which slidably engages in the arm 49 secured to the standard 2. At the upper end of the rod 48 is the roller 50 which engages the cam 51 secured to the laterally extending arm 9 by the bracket 51¹. 52 is a coil spring between the arm 49 and the dog 47 for yieldably holding the roller 50 in engagement with the cam 51 at all times. The arrangement is such that during the rearward movement of the support 8 and head 6 when the file 7 is filing a saw tooth, the dog 47 is allowed to move vertically downward under the tension of the coil spring 52 and to engage the next tooth of the gear wheel 46. Upon forward movement of the support and head when the file is raised out of engagement with the saw tooth, the cam 51 raises the dog 47 through the roller 50 and the rod 48 to rotate the gear wheel 46 and the circular saw a distance of one gear wheel tooth and also a distance of one saw tooth, this indexing movement being completed before the file is lowered into engagement with the saw. 53 is a collar, fixedly secured to the shaft 48 above the arm 49, this collar being adjustable upon the rod to limit the downward movement of the dog 47.

To rotate the saw 5 when clamped so that its teeth will register with the file 7 there is a stub shaft 54 carrying the saw clamping parts and rotatably adjustably secured to the arbor 3 in alignment therewith. As shown, the arbor 3 has the radially extending projection 55 while the stub shaft 54 has the projections 56 on opposite sides thereof. 57 are set screws threadedly engaging the projections 56 and adapted to engage the projection 55. By means of rotating the set screws, the stub shaft 54 may be rotatably adjusted relative to the arbor 3. The stub shaft 54 and arbor 3 are also secured to each other by means of the cap bolts 58 engaging in concentric elongated apertures 59 in the annular flange of the stub shaft 54 and threadedly engaging in annular flange of the arbor 3.

To adjust the parts so that the file will be in raised position and out of engagement with the saw in order to permit of ready removal of the saw and replacement of another, the hand wheel 60 is provided fixedly secured to the shaft 12. The vertically adjustable slide 21 may also be raised for this purpose.

In order to hold the saw in its various positions, there is a spring pressed dog 61 engageable with the teeth of the gear wheel 46 and mounted upon the base 1. The arrangement is such that the gear wheel can be rotated in one direction only.

What I claim as my invention is:

1. The combination with means for holding a saw, of a member reciprocable transversely of the saw and adapted to hold a file for filing the teeth thereof, means for reciprocating said member, means for bodily raising said member during its travel in one direction to disengage the file from the teeth of the saw, and means independent of the saw for indexing the same while said member is in raised position.

2. In a saw filing machine, the combination with an arbor adapted to carry a circular saw, of a reciprocating head movable transversely of the saw and adapted to hold a file for filing the teeth of the saw, means for reciprocating said head and rotatably indexing said arbor, and means operable during the travel of said head in one direction for raising the same to disengage the file from the saw.

3. In a saw filing machine, the combination with an arbor for carrying a circular saw, of a member movable transversely over said saw and adapted to hold a file for filing the teeth thereof, index mechanism on said arbor and means for actuating said index mechanism and said file carrying member.

4. In a saw filing machine, the combination with an arbor adapted to carry a circular saw and a gear wheel upon said arbor, of a transversely movable head adapted to hold a file for engaging the teeth of the saw, a dog engageable with the teeth of said gear wheel for rotating the same and means for actuating said head and dog.

5. The combination with an arbor adapted to carry a circular saw, of a head reciprocable transversely of the saw and adapted to hold a file for filing the teeth thereof, a reciprocable support for said head, a cam mounted upon said support and movable therewith, means upon said head for engaging said cam to raise and lower the same relative to said support, and stops for limiting the movement of said cam.

6. The combination with an arbor adapted to hold a circular saw and a gear wheel upon said arbor, of a head reciprocable transversely of the saw and adapted to hold a file for filing the teeth thereof, a reciprocable support for said head having a vertically slidable engagement therewith, a cam mounted upon said support and movable therewith a roller upon said head engaging said cam for raising and lowering said head relative to said support, stops for limiting the movement of said cam, a reciprocable dog engageable with the teeth of said gear wheel, means upon said support for actuating said dog.

7. In a saw filing machine, the combination with a member, of a plate secured thereto and rotatably adjustable relative thereto, a bifurcated member secured to said plate and rotatably adjustable relative thereto in a transverse plane, and cylindrical members for engaging a file, clamped in the furcations of said bifurcated member.

8. In a saw filing machine, the combination with a support, of a vertically movable slide engaging said support, a vertically adjustable slide engaging said first mentioned slide and carrying a file, and means for vertically moving said slides as a unit relative to said support.

9. In a saw filing machine, the combination with a reciprocable support, of a cam slidably engaging said support and movable therewith, means for limiting the movement of said cam, a vertically movable slide engaging said support, a roller upon said slide and engaging said cam, and means for maintaining said roller in engagement with said cam at all times.

10. In a saw filing machine, the combination with a rotatable arbor, of a clamp for a saw upon said arbor, and means for rotatably adjusting said clamp relative to said arbor and parallel to the direction of rotation of the latter.

11. In a saw filing machine, the combination with an arbor provided with a radially extending projection, of a clamp for a saw having a stub shaft provided with projections embracing said first mentioned projection, and set screws threadedly engaging said embracing projections and adapted to contact with said first mentioned projection to vary the relative rotative positions of said arbor and clamp.

12. In a saw filing machine, the combination with an arbor for carrying a circular saw and a gear wheel fixedly secured to said arbor, of a member carrying a file and reciprocable transversely of the saw, a reciprocable support for said member, a cam upon said support and movable therewith, means actuated by said support for rotatably adjusting said gear wheel, and means for limiting the movement of said adjusting means in one direction.

13. In a saw filing machine, the combination with an arbor for carrying a circular saw and a gear wheel fixedly mounted upon said arbor, of a horizontally reciprocable member, a cam upon said member and movable therewith, a dog engageable with the teeth of said gear wheel, a vertically movable rod secured to said dog, a roller upon said rod in engagement with said cam, means for yieldably maintaining said roller in engagement with said cam, and means upon said rod for limiting the downward movement thereof.

14. The combination with means for holding a saw, of abrasive means engageable with the saw and reciprocable transversely thereof, means for reciprocating said abrasive means, means for relieving said abrasive means from engagement with the saw, and means independent of the saw for indexing the same while said abrasive means is relieved from engagement therewith.

15. The combination with means for holding a saw, of abrasive means engageable with the saw and reciprocable transversely thereof, means for indexing the saw, and a common means for actuating said indexing means and abrasive means.

16. In a saw filing machine, the combination with an arbor, of a clamp for a saw mounted upon said arbor, cooperating projections upon said clamp and arbor, and means adjustably engaging said projections for varying the relative rotative positions of said clamp and arbor.

17. The combination with a holder for a saw, of a head reciprocable transversely of the saw and movable toward and away therefrom, said head being adapted to carry an abrasive member engageable with the saw teeth, a reciprocable support for said head, and means movable with said support through a portion of its stroke for moving said head away from the saw to bodily move said abrasive member away from the saw.

18. The combination with a holder for a saw, of a head reciprocable transversely of the saw and movable toward and away therefrom, said head being, adapted to carry an abrasive member engageable with the teeth of the saw, a reciprocable support for said head, means upon said support for moving said head away from the saw, and means operated by said reciprocable support for indexing the saw.

In testimony whereof I affix my signature.

WILLIAM S. PRITCHARD.